(12) United States Patent
Gopi et al.

(10) Patent No.: US 8,434,022 B2
(45) Date of Patent: Apr. 30, 2013

(54) SYSTEM AND METHOD FOR PHOTO-IMAGE LOCAL DISTRIBUTION

(75) Inventors: Paramesh Gopi, Cupertino, CA (US); Vinay Ravuri, Santa Clara, CA (US); Dimitry Vaysburg, Livermore, CA (US); Prodyut Hazarika, Mountain View, CA (US); Dmitriy Shtalenkov, Foster City, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 603 days.

(21) Appl. No.: 12/436,086

(22) Filed: May 5, 2009

(65) Prior Publication Data

US 2010/0281394 A1    Nov. 4, 2010

Related U.S. Application Data

(63) Continuation-in-part of application No. 12/432,625, filed on Apr. 29, 2009, and a continuation-in-part of application No. 12/431,914, filed on Apr. 29, 2009, which is a continuation-in-part of application No. 12/432,559, filed on Apr. 29, 2009.

(51) Int. Cl.
*G06F 3/48* (2006.01)

(52) U.S. Cl.
USPC ........... 715/810; 715/748; 715/769; 345/157; 345/84; 348/207.1; 348/207.11; 348/14.02; 740/223; 702/141; 702/150

(58) Field of Classification Search .................... 715/810
See application file for complete search history.

(56) References Cited

U.S. PATENT DOCUMENTS

| | | | | |
|---|---|---|---|---|
| 6,636,259 | B1* | 10/2003 | Anderson et al. | 348/211.3 |
| 7,711,868 | B2* | 5/2010 | Rhoten et al. | 710/15 |
| 7,716,008 | B2* | 5/2010 | Ohta | 702/152 |
| 7,774,155 | B2* | 8/2010 | Sato et al. | 702/127 |
| 7,792,708 | B2* | 9/2010 | Alva | 705/26.1 |
| 7,865,845 | B2* | 1/2011 | Dettinger et al. | 715/863 |
| 7,934,995 | B2* | 5/2011 | Suzuki | 463/37 |
| 7,942,745 | B2* | 5/2011 | Ikeda et al. | 463/38 |
| 2003/0007007 | A1* | 1/2003 | Hinegardner et al. | 345/769 |
| 2004/0174327 | A1* | 9/2004 | Bowden et al. | 345/84 |
| 2005/0278646 | A1* | 12/2005 | Liscano et al. | 715/762 |
| 2006/0085531 | A1* | 4/2006 | Lei et al. | 709/223 |
| 2006/0129855 | A1* | 6/2006 | Rhoten et al. | 713/320 |
| 2006/0277485 | A1* | 12/2006 | Kum | 715/769 |

(Continued)

OTHER PUBLICATIONS

Windows Vista (released on Feb. 4, 2008), screenshot of available wireless devices, 3 pages.*

(Continued)

*Primary Examiner* — William Bashore
*Assistant Examiner* — Reza Nabi
(74) *Attorney, Agent, or Firm* — Turocy & Watson, LLP

(57) ABSTRACT

A system and method are provided for the local distribution of stored photo-images to wireless picture frames. The method interfaces a photo-image discovery device, having no dedicated display, to a display monitor presenting a menu of photo-image user prompt options originating from the photo discovery device. A photo-image from the storage site is selected, as well as a wireless picture frame destination. Then, the photo-image is wirelessly sent to the selected destination. In one aspect, the wireless picture frame is selected in response to discovery device movements.

18 Claims, 11 Drawing Sheets

U.S. PATENT DOCUMENTS

| | | | |
|---|---|---|---|
| 2007/0220562 A1* | 9/2007 | Janssen et al. | 725/81 |
| 2008/0039212 A1* | 2/2008 | Ahlgren et al. | 463/46 |
| 2008/0070655 A1* | 3/2008 | Tanabe | 463/7 |
| 2008/0168523 A1* | 7/2008 | Ansari et al. | 725/131 |
| 2008/0171596 A1* | 7/2008 | Hsu | 463/39 |
| 2008/0195962 A1* | 8/2008 | Lin et al. | 715/771 |
| 2008/0242385 A1* | 10/2008 | Miyamoto | 463/1 |
| 2008/0270926 A1* | 10/2008 | Dettinger et al. | 715/769 |
| 2009/0058869 A1* | 3/2009 | Gustin et al. | 345/581 |
| 2009/0174648 A1* | 7/2009 | Wang et al. | 345/104 |
| 2010/0007528 A1* | 1/2010 | Urata et al. | 341/20 |
| 2010/0007529 A1* | 1/2010 | Urata et al. | 341/20 |
| 2010/0017301 A1* | 1/2010 | Alva | 705/26 |
| 2010/0022218 A1* | 1/2010 | Chen | 455/411 |
| 2010/0138365 A1* | 6/2010 | Hirvela et al. | 706/12 |
| 2010/0157067 A1* | 6/2010 | Karn et al. | 348/207.1 |
| 2010/0160048 A1* | 6/2010 | Rabin et al. | 463/43 |
| 2010/0171805 A1* | 7/2010 | Ron et al. | 348/14.02 |
| 2010/0184372 A1* | 7/2010 | Tabaaloute | 455/41.1 |
| 2010/0248823 A1* | 9/2010 | Smith | 463/29 |
| 2010/0253842 A1* | 10/2010 | Huang et al. | 348/552 |
| 2010/0280829 A1* | 11/2010 | Gopi et al. | 704/275 |
| 2010/0293105 A1* | 11/2010 | Blinn et al. | 705/319 |
| 2010/0323794 A1* | 12/2010 | Su | 463/36 |
| 2011/0001697 A1* | 1/2011 | Mao | 345/157 |
| 2011/0023105 A1* | 1/2011 | Islam et al. | 726/11 |
| 2011/0044483 A1* | 2/2011 | Edgar | 381/314 |
| 2011/0087674 A1* | 4/2011 | Schokking et al. | 707/748 |

OTHER PUBLICATIONS

Wii Sports, "How to play Nintendo Wii Archery", posted at eHow.com <http://e-how.com>, 5 pages.*

* cited by examiner

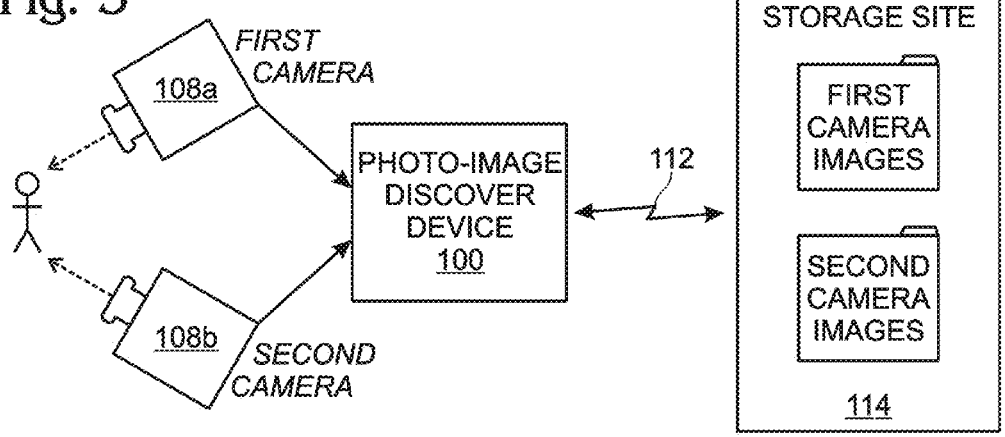
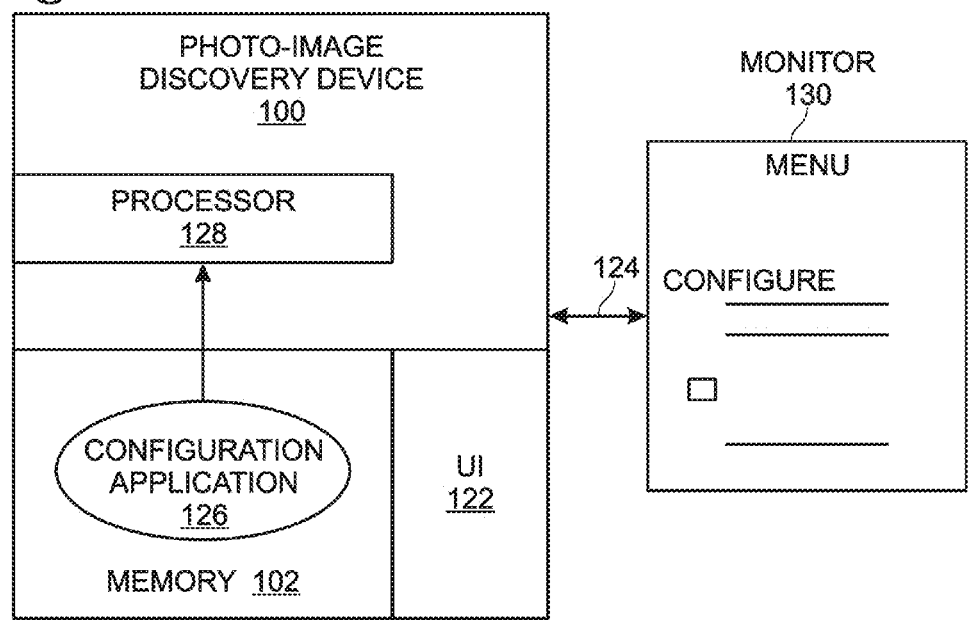

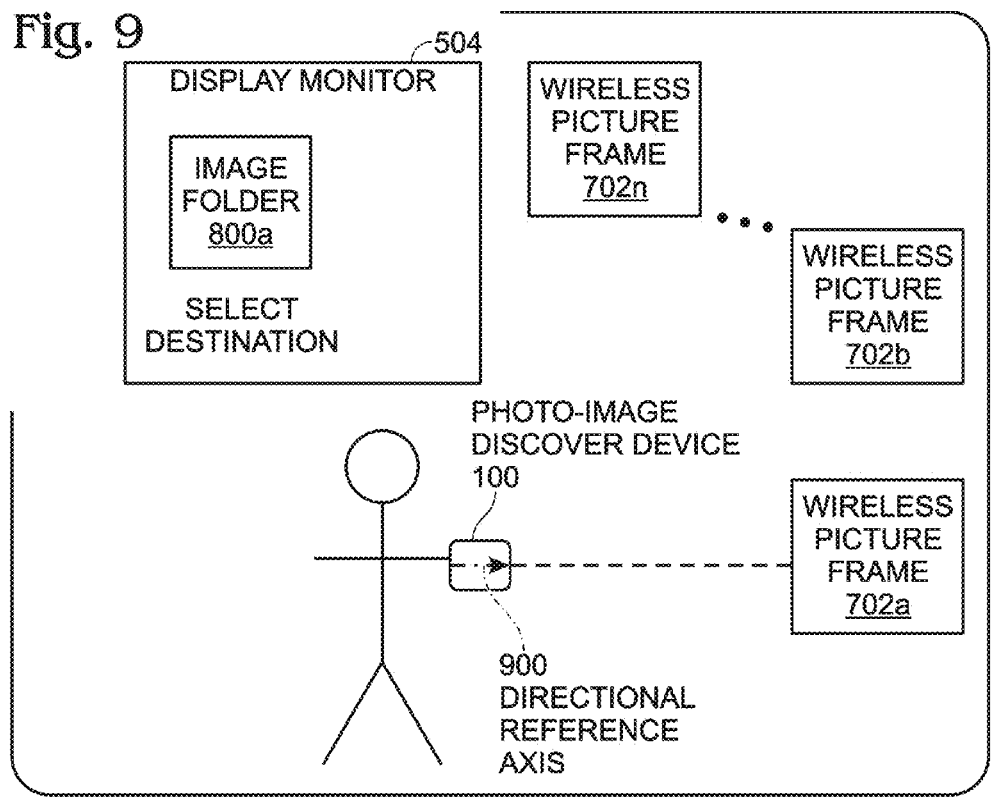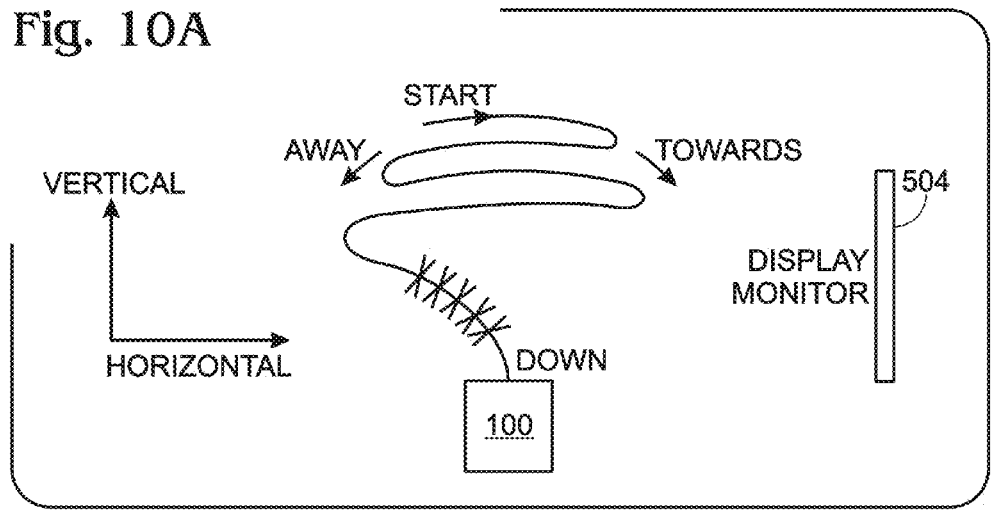

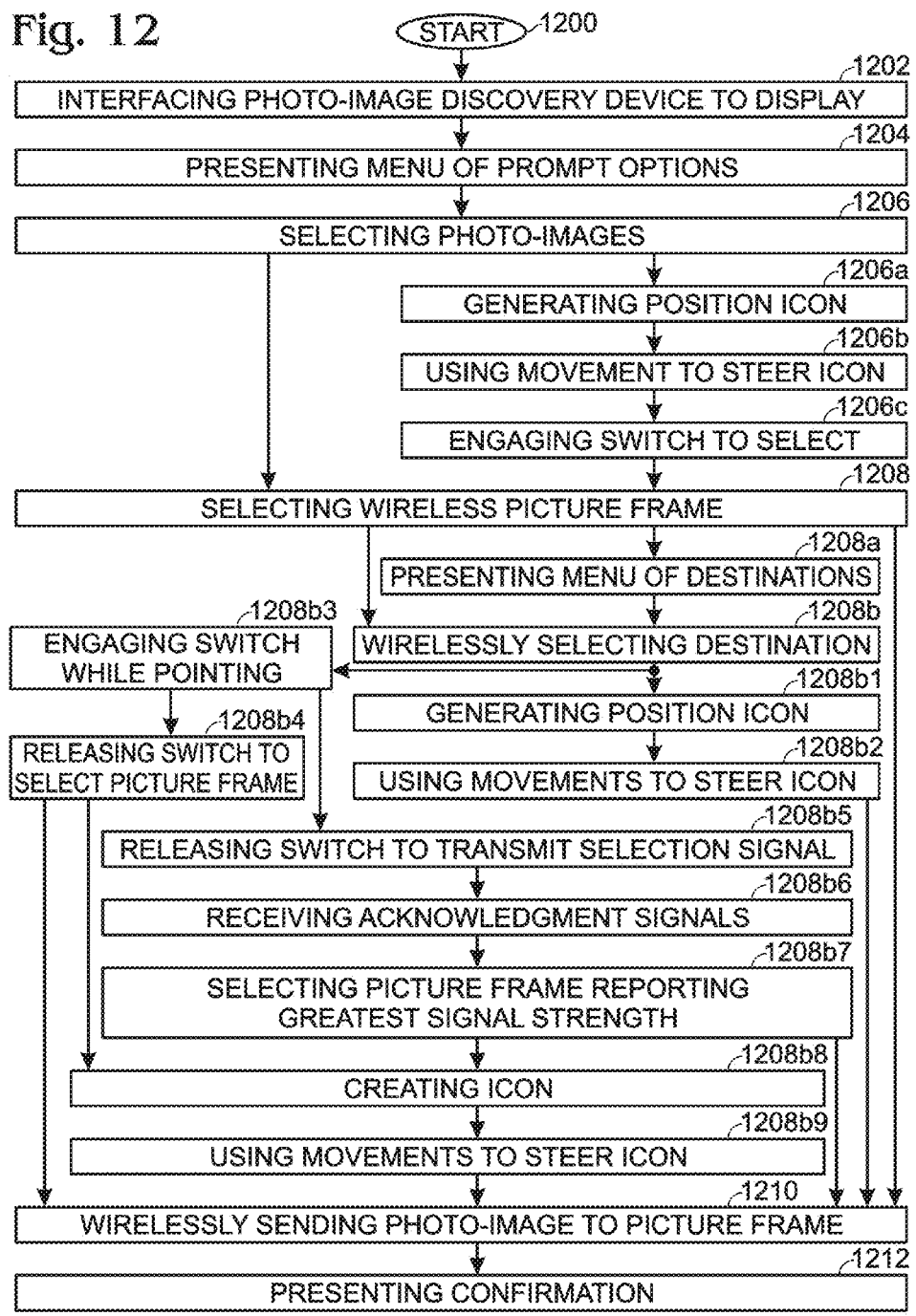

SYSTEM AND METHOD FOR PHOTO-IMAGE LOCAL DISTRIBUTION

RELATED APPLICATIONS

This application is a Continuation-in-Part of a pending application entitled, SYSTEM AND METHOD FOR PHOTO-IMAGE UPLINK CONFIRMATION, invented by Vaysburg et al., Ser. No. 12/432,625, filed Apr. 29, 2009;

This application is a Continuation-in-Part of a pending application entitled, SYSTEM AND METHOD FOR VIRTUAL KIOSK STORED PHOTO-IMAGE REPRODUCTION, invented by Vaysburg et al., Ser. No. 12/431,914, filed Apr. 29, 2009;

which is a Continuation-in-Part of a pending application entitled, SYSTEM AND METHOD FOR PHOTO-IMAGE DISCOVERY AND STORAGE, invented by Vaysburg et al., Ser. No. 12/432,559, filed Apr. 29, 2009. All these disclosures are incorporated herein by reference.

BACKGROUND OF THE INVENTION

1. Field of the Invention

This invention generally relates to electronic image processing and, more particularly, to a system and method for photo-image management, transformation, delivery, uplink confirmation, and distribution.

2. Description of the Related Art

Conventional technology permits a user to connect their camera or memory card to a personal computer (PC), open a software application in the PC, and upload images for local storage. Once the images are stored, the user may select images for local printing, organize folders, or create a CD. Further, the images may be uploaded to a network-connected storage site vendor, such as Costco. Once the images are uploaded, the user may select images for printing, and have the printed pictures prepared for pickup or delivery. Otherwise, the user can have the images archived.

Unfortunately, these operations are cumbersome and require extensive human interaction. Further, a minimal amount of technical acumen is required to perform these operations, and if the user is technophobic, the images may remain in the camera until they are lost, erased, or overwritten.

Eye-Fi™ is a wireless memory card that automatically uploads any images on the card, via a WiFi (IEEE 802.11) link, to a user's PC for local storage, or to a network-connected storage site. Unfortunately, the images remain on the memory card until the user comes within range of a WiFi access point (AP). The user cannot upload their images via a public AP unless the card has been previously preconfigured. Such an operation would require the use of a PC and a related software application. Due to the relatively long time it takes to upload a single image, the system is only practical for user who has a personal (home) WiFi AP. Further, while the automatic upload feature is a convenience, the user has lost all ability to edit and organize the images leaving the camera, and it is not necessarily easy to organize the images once they have been uploaded. The user must leave the camera turned on to upload imaged, but neither the camera nor the memory card gives any indication of whether a link is available, the link bandwidth, the number of files uploaded, or incorrect format issues. As a result, the user must leave the camera on and guess whether the images have been uploaded. Glitches in the upload process often require the camera power to be recycled or WiFi AP to be rebooted. Therefore, user is unaware of which if any, images have been successfully uploaded until they inventory their storage. Even if the images are successfully uploaded, the camera power may be drained if the user leaves the camera on and hopes for the best.

Conventionally, an end user who wants to print, order prints of their pictures, create albums, or personalize their photos, must use either a PC-driven software tool, or go to a store photo kiosk. The first option requires a working knowledge of PCs and a high-speed Internet connection. Alternately, if a user goes to the store, they must bring their SD card or USB key to select the pictures. This selection process can be lengthy and may require assistance from store personnel.

It would be advantageous if photo-images stored in a network-connected storage site could be easily distributed to wireless picture frames.

It would be advantageous if the above-mentioned photo-image distribution could be aided with the use of intuitive motioning of a handheld device that interfaced between the storage site and the picture frames.

SUMMARY OF THE INVENTION

A photo discovery system and method are disclosed herein that are capable of acquiring images from a variety of different sources, such as a digital camera, camcorder, 3G phone, cell phone, or personal computer (PC), and upload them into an Internet-connected storage/processing service. Once stored, the same photo discovery device can be used print, archive, or otherwise manage the images as a virtual kiosk, without the use of a personal computer (PC). The photo discovery device can also be used to access the photo-images from the storage site and distribute selected photo-images to wireless picture frames.

Accordingly, a method is provided for the local distribution of stored photo-images to wireless picture frames. The method interfaces a photo-image discovery device, having no dedicated display, to a display monitor presenting a menu of photo-image user prompt options originating from the photo discovery device. A photo-image from the storage site is selected, as well as a wireless picture frame destination. Then, the photo-image is wireless sent to the selected destination.

In one aspect, the photo-image discovery device interfaces to a display monitor having a wireless interface port. Then, a wireless picture frame destination is selected by presenting a menu of wireless picture frame destinations and wirelessly selecting the destination in response to a user prompt. More explicitly, the destination is selected in response to movement of the photo-image discovery device. For example, a position icon may be generated on the display monitor responsive to the movement of the photo-image discovery device, with the photo-image discovery device movements being used to steer the position icon from the selected photo-image to the selected destination.

In another variation the photo-image discovery device has a directional reference axis for pointing. Then, the photo-image discovery device can be used to select a wireless picture frame by pointing at the actual location of a wireless picture frame in a local physical environment surrounding the photo-image discovery device.

Additional details of the above-described method, and a photo-image discovery device system for the local distribution of stored photo-images to wireless picture frames, are provided below.

BRIEF DESCRIPTION OF THE DRAWINGS

FIG. 3 is a diagram depicting a second exemplary image organization transaction.

FIGS. 4A and 4B depict two exemplary processes for configuring the photo-image discovery device of FIG. 1.

FIG. 9 is a diagram depicting a variation in the selection of wireless picture frames.

FIGS. 10A through 10E are diagrams depicting some exemplary motion prompts.

FIG. 12 is a flowchart illustrating a method for the local distribution of stored photo-images to wireless picture frames.

DETAILED DESCRIPTION

Figure 1:
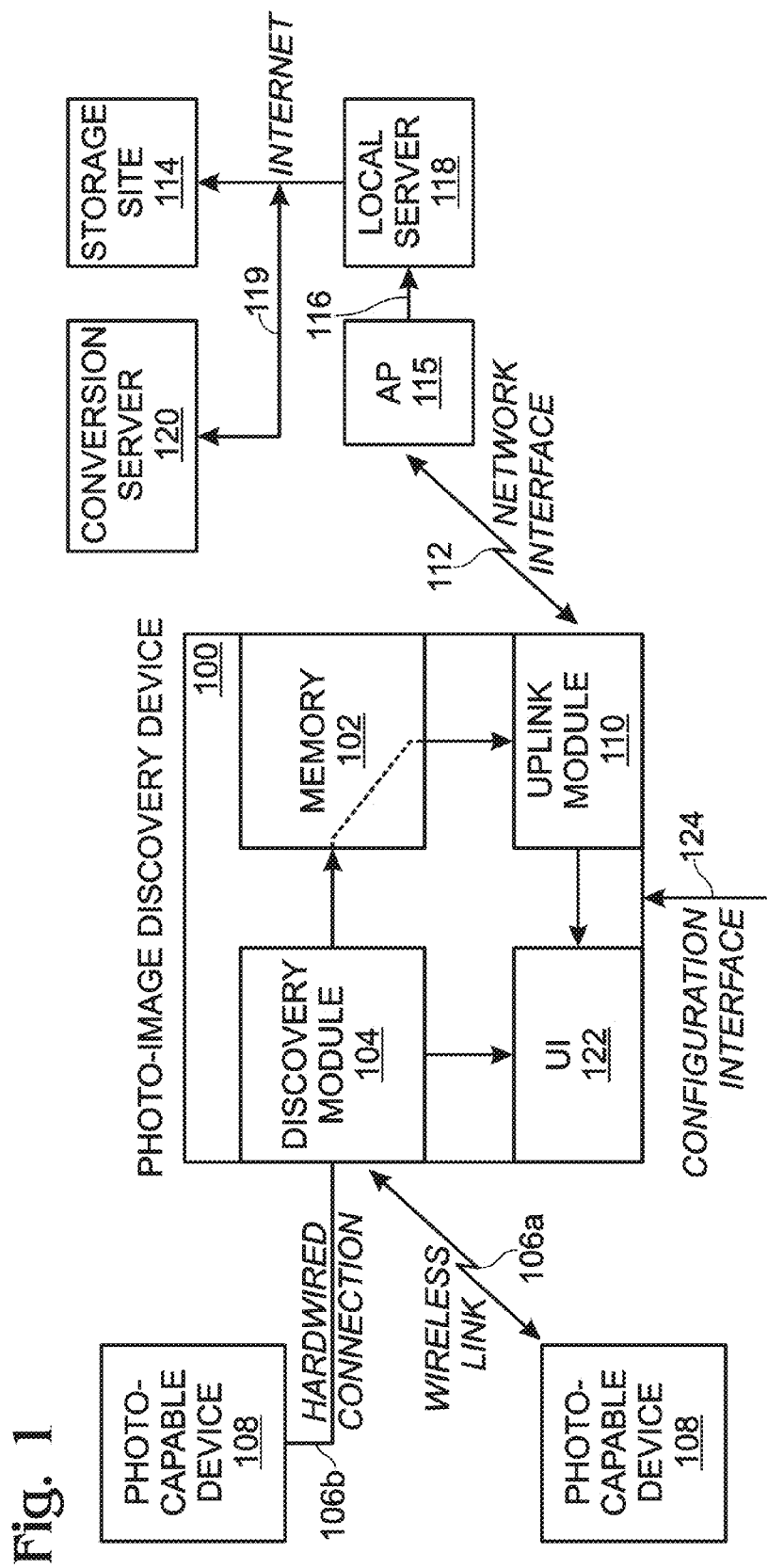
FIG. 1 is a schematic block diagram of a photo-image discovery device.

FIG. 1 is a schematic block diagram of a photo-image discovery device. The photo-image discovery device 100 comprises a memory 102 and a discovery module 104 having a scanning interface on line 106 for detecting photo-capable devices. In one aspect, the discovery module scanning interface concurrently scans wireless and hardwired connector interfaces. The wireless interface is represented by reference designator 106a and the hardwire connector interface by reference designator 106b. For simplicity, only a single wireless and single hardwired interface are shown. However, it should be understood that multiple such interfaces may be required for different protocols, frequencies, and connector types.

Some examples of the wireless interface 106a include Bluetooth, wireless USB, and IEEE 802.11 (WiFi) interfaces. However, the device 100 is not limited to just these examples. Some examples of hardwire connector interface 106b include Universal Serial Bus (USB) and SD memory card interfaces. Some examples of photo-image file types include JPEG, GIF, EXIF, native format, BMP, CR2, RAW, and MPEG. Again, the system is not limited to just these exemplary file types and interfaces.

The discovery module 104 determines if detected photo-capable devices 108 have stored electronically formatted photo-images, and if so, acquires the photo-images into the memory 102. If the detected photo-images have been previously acquired into the memory, the photo-images are not reacquired. Some examples of photo-capable devices include a cellular telephone, 3G cell phone, a personal computer (PC), controlled automation device, digital video disk (DVD) device, camera-enabled wireless device, video-enabled wireless device, television, digital video recorder (DVR), secure digital (SD) memory card, digital camera, and game console. Some examples of a controlled automation device include home camera security system and a remotely programmable DVR. In one aspect, the discovery module 104 acquires photo-images from only preconfigured photo-capable devices 108. That is, the discovery module 104 will only acquire photo-images from a limited group of devices with which it has been given permission to act. In this manner, the photo-image discovery device will not "accidentally" acquire images from unauthorized sources. The photo-image discovery device enters photo-capable device configuration commands via a built-in user interface (UI) 122, or via a configuration interface 124, as explained in more detail below.

An uplink module 110 has a network interface on line 112. The uplink module 110 automatically uploads the photo-images in the memory 102 to a network-connected storage site 114. Although only a single storage site is shown for simplicity, it should be understood that the photo-image discovery device is able to communicate with any number of storage sites. The photo-image discovery device may send the same photo-images to more than one storage site. As used herein, a storage site may be a commercial site for printing or archiving photo-images, a site for sharing or publishing photo-images, such as YouTube, or even a local storage site. As another example, a user may be able to monitor their home security system via images sent to a "public" site such as YouTube. As another example, the discovery device may acquire a movie from a device such as a PC, and store the movie in a local memory site. As another example, the discovery device may transfer photo-images acquired from one photo-capable device to a different photo-capable device. In this manner, the photos on one SD card in a first camera may be loaded into the SD card residing in a second camera.

In one aspect, the uplink module 110 uploads photo-images via a WiFi interface to a network-connected server 114. As shown, a WiFi access point (AP) 115 wirelessly receives information from the photo-image discovery device, transfers the information via a landline 116 to a local server 118, which then uses an Internet protocol to transfer the information to storage server 114 via line 119. However, it would be possible to upload photo-images using other nodes or other protocols to reach the storage site.

Typically, the discovery module 104 acquires and stores the photo-images into memory in the first format, and the uplink module 110 uploads the acquired photo-image in the first format. In one aspect, the discovery module uploads photo-images in a first format (e.g., JPEG) and converts the photo-images to a second format (e.g., GIF). Then, the uplink module 110 uploads photo-images in the second format to the storage site 114. Alternately, the discovery module 104 acquires photo-images in a first format and the uplink module 110 uploads the photo-images to a network-connected conversion device 120 for conversion into a second format. In one aspect, the converted photo-images are returned to the photo-discovery device 100 for uplink to the storage site 114. Alternately, the conversion device transfers the converted photo-images to the storage site directly, via line 119.

In a different aspect, the photo-images may be acquired and uploaded in the same file format, but can have image attributes changed such as the resolution, compression ratio, red-eye removal. The attributes changed would be dependent upon the attribute parameters associated with the storage device or destination.

In another aspect, the uplink module 110 has an interface for receiving storage site selection commands and transfers the photo-images to at least one selected storage site. The commands may be entered via a built-in user interface (UI) 122, or communicated via a configuration interface 124, as explained in more detail below. The uplink module 110 may determine a photo-image format associated with the selected storage and direct the discovery module or conversion site to convert acquired photo-images to the format associated with the selected storage device.

In one aspect, the UI 122 receives a signal from the uplink module 110 subsequent to uploading the photo-images to the storage site, indicating that the photo-images have been successfully uploaded. In turn, the UI 122 supplies an indication to the user of a successful upload. Likewise, in the event of a failure to upload the photo-images to the storage site, the uplink module 110 may supply a signal to the UI, and the UI supply a prompt to the user, indicating that the photo-images have not been successfully uploaded.

For example, the UI may be a light emitting diode (LED), or a set of LEDs, where LED groups, LED flash patterns, or LED colors signify different events. In another aspect, the UI 122 may incorporate a visual display, such as a liquid crystal display (LCD). Further, the UI 122 may incorporate buttons, switches, a keypad, or a mouse to accept user commands. In one aspect, the discovery module 104 automatically acquires photo-images from devices. However, in another aspect the discovery module only acquires photo-images in response to a UI prompt. That is, the UI 122 indicates that photo-images are available for acquisition, and the user must affirmatively authorize acquisition using a UI button, switch, or the like.

In a similar manner, if the discovery module 104 fails to acquire the photo-images into the memory, it supplies a signal to the UI indicating that the photo-images have not been successfully acquired. In turn, the UI 122 supplies some kind of indicator to the user. Likewise, if the discovery module 104 successfully acquires the photo-images into the memory, it supplies a signal to the UI 122, and the UI 122 supplies an appropriate indicator to the user.

The discovery module 104 may also organize acquired photo-images into folders using criteria such as user, the photo-image discovery device ID, file types, or the photo-capable device originating the photo-images, to name a few examples. The folders may be established in memory 102. Alternately, instructions may accompany the uplinked photo-images, so that folders are created at the storage site 114, and the photo-images stored in the corresponding folder types.

It is difficult for a user to remember the circumstances associated with each of their photos. This problem is compounded when the user is faced with the daunting task of remembering, sorting, and organizing photos on a camera memory card filled with hundreds of pictures. Conventional processes that simply move the photos from one storage site (i.e. the memory card) to a second storage site (i.e. a PC or network-connected storage site) do not adequately address this problem.

Figure 2:
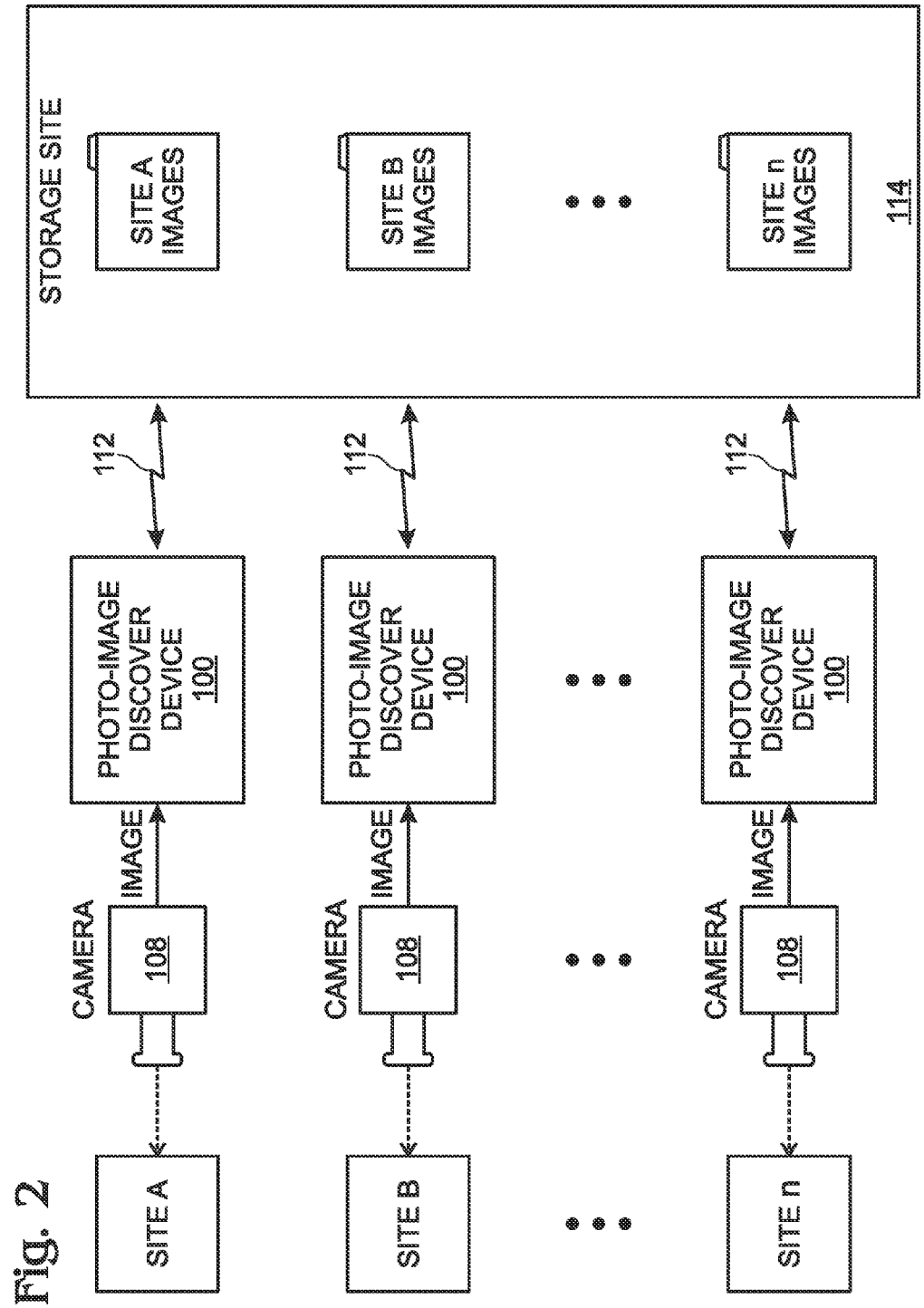
FIG. 2 is a diagram depicting a first exemplary image organization transaction.

FIG. 2 is a diagram depicting a first exemplary image organization transaction. The photo-image discovery device disclosed herein advantageously acts as an intermediary between images stored on a camera device and storage, giving the user the opportunity to organize images. Some of this organization is performed using the mechanisms already described above. For example, the photo-image discovery device may be preconfigured to separate the images associated with each acquisition/upload operation into a separate folder. If the user is a tourist in Rome, they may choose to manually acquire/upload images after each attraction (sites A through n) they visit. In that manner, the photos associated with each attraction are automatically organized into separate folders at the storage site.

FIG. 3 is a diagram depicting a second exemplary image organization transaction. As another example, the photo-image discovery device may be configured to acquire images from two cameras. If there is a different user associated with each camera, the photo-image discovery device automatically insures that the acquired/uplinked photo-images are being saved in different folders differentiated by user (camera).

More complicated organizational schemes may be preconfigured or implemented on-the-fly if the UI 122 is sophisticated enough. Alternately, if the UI 122 is simple (i.e. a set of LEDs), the configuration interface 124 may be used to enter commands.

Figure 4B:
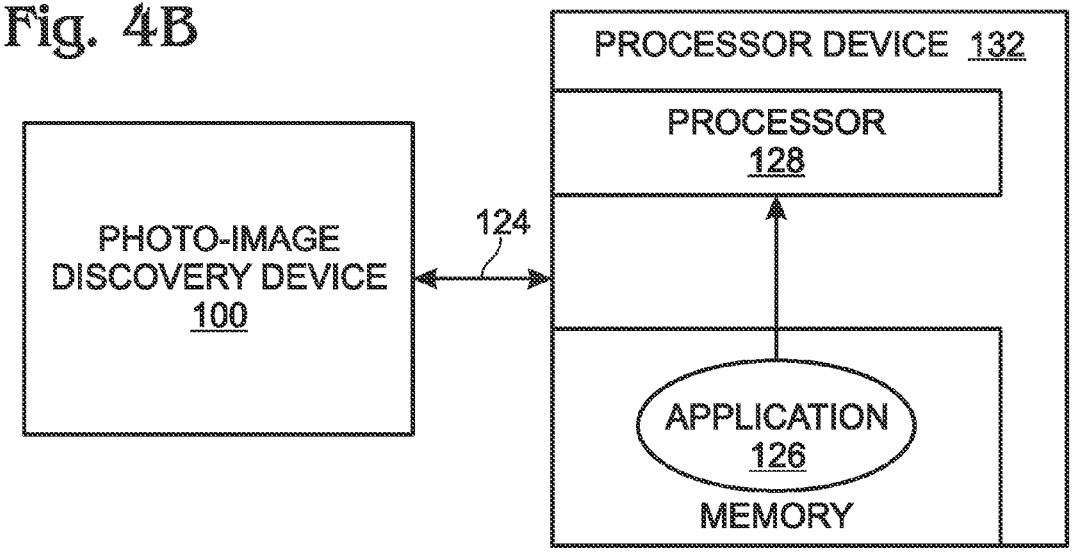

FIGS. 4A and 4B depict two exemplary processes for configuring the photo-image discovery device of FIG. 1. Generally, as shown in FIG. 4A, the configuration interface is wirelessly or hardwire connected to a simple monitor 130, such as a television screen. A configuration software application 126 is stored in memory 102 and enabled as processor instructions. The instructions are executed by processor 128. By executing instructions in the configuration application, the photo-image discovery device is able to generate a menu of instruction prompts and menu options on monitor 130. The user is able to navigate through the menu of prompts and options using the UI 122 (e.g., buttons or keypad). In one aspect, the photo-image discovery device is able to make selections as a wireless point-and-click device.

In another variation (FIG. 4B), the configuration software application 126 resides in a microprocessor device 132 such as a PC or cell phone. Changes and modifications to the photo-image discovery device are made by running the configuration application on the PC. Then, the changes can be loaded into the photo-image discovery device via the configuration interface 124.

Figure 5:
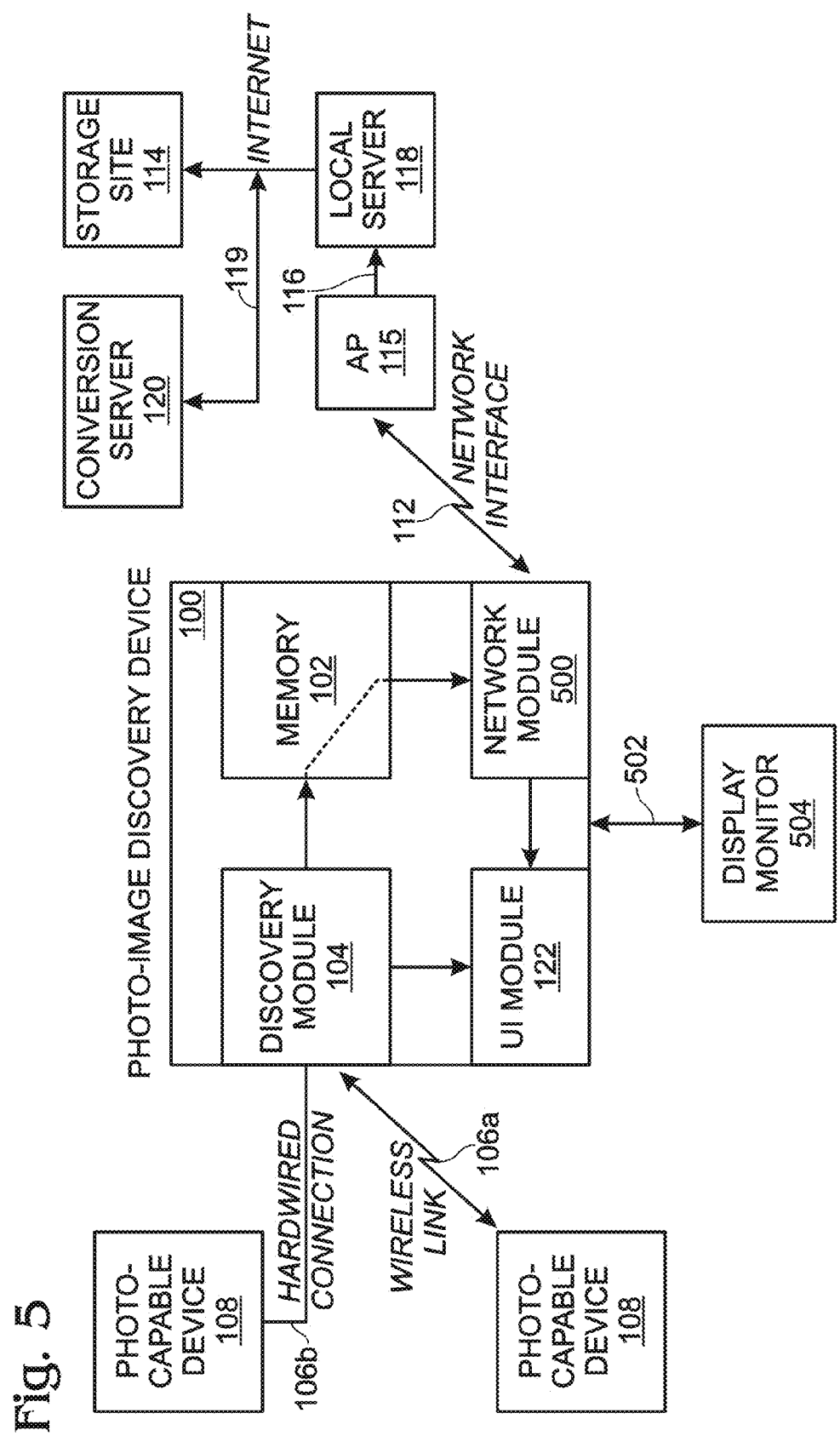
FIG. 5 is a schematic block diagram of a virtual photo-image reproduction kiosk.

FIG. 5 is a schematic block diagram of a virtual photo-image reproduction kiosk. The virtual kiosk comprises a photo discovery device 100. In one aspect, the photo discovery device may include a few switches and LED indicators, but the photo discovery 100 device has no dedicated display. The photo discovery device 100 includes a network module 500 for automatically uplinking photo-images to a network-connected storage site. This uplink function has been described above in the explanation of the uplink module. However, since the functions of the uplink module are expanded in this aspect, it is referred to as a network module in FIGS. 5-7.

The network module 500 accesses the storage site 114 and downloads selected photo-images. Typically, the network module 500 uplinks and downloads photo-images from the storage site 114 using an IEEE 802.11 (WiFi) link. However, it would be possible to use other wireless formats. In a different aspect, the network module 500 receives a selected photo-image in a first photo-image file format (e.g. JPEG) and the UI module 122 converts the first photo-image file format to a second file image format (e.g., TIFF). The UI has been described above in FIG. 1 as a relatively simple user interface. However, since the function of the UI is expanded in this aspect, it is referred to as a UI mode in FIGS. 5-7.

The user interface (UI) module 122 has an interface on line 502 for connection to a display monitor 504. The UI module 122 interfaces the photo discovery device to the display monitor 504 using an interface such as USB, high-definition multimedia interface (HDMI), or wireless. The display monitor 504 may be a television, PC, electronic picture frame, gaming platform, or cell phone to name a few examples. Some examples of wireless interfaces include Bluetooth and WiFi. The display monitor 504 is used to visually, and sometimes audibly, present a menu of photo-image user prompt options. The prompt options are used to select stored photo-images in response to the network module 500 accessing the storage site 114.

Generally, the network module 500 sends an inquiry to the storage site 114 requesting an inventory of stored photo-images and receives the inventory results. The UI module 114 presents the inventory results on the display monitor 504. In one aspect, the network module 500 accesses a storage site including a plurality of photo-image folders. The UI module 122 presents the folders on the display monitor 504, and provides prompts for selecting a folder. Some examples of folders are presented in the explanation of FIGS. 2 and 3. However, there are a number of ways of organizing photo-images into folders.

Subsequent to receiving the selected photo-images, the UI module 122 may receive prompts for transforming selected photo-image attributes. Some examples of image transformations include resizing, zooming, placement, cropping, rotation, resolution, compression, color editing, lightness editing, and red-eye removal. However, this is not an exhaustive list of every possible transformation. The UI module 122 can also be used to present a source profile menu for options on the display monitor 504. Some examples of sources include the photo-capable devices originating the photo-images that are uplinked to the storage site, and file formats.

In another aspect, the UI module 122 can be used to select delivery options for selected photo-images. That is, the network module 500 uplinks photo-images to the storage site 144 and accesses the storage site in response to prompts received by the UI module 122. The UI module also receives prompts for selecting a delivery option from a retailer associated with the first storage site. Then, the network module 500 sends selected delivery options to the storage site. More precisely, the UI module 122 receives input from a user operating the photo discovery device, and sends selection commands in response to the user input. For example, the UI module 122 may receive prompts for selecting a delivery media option such as printed media, DVD, video tape, or SD memory card.

Figure 6:
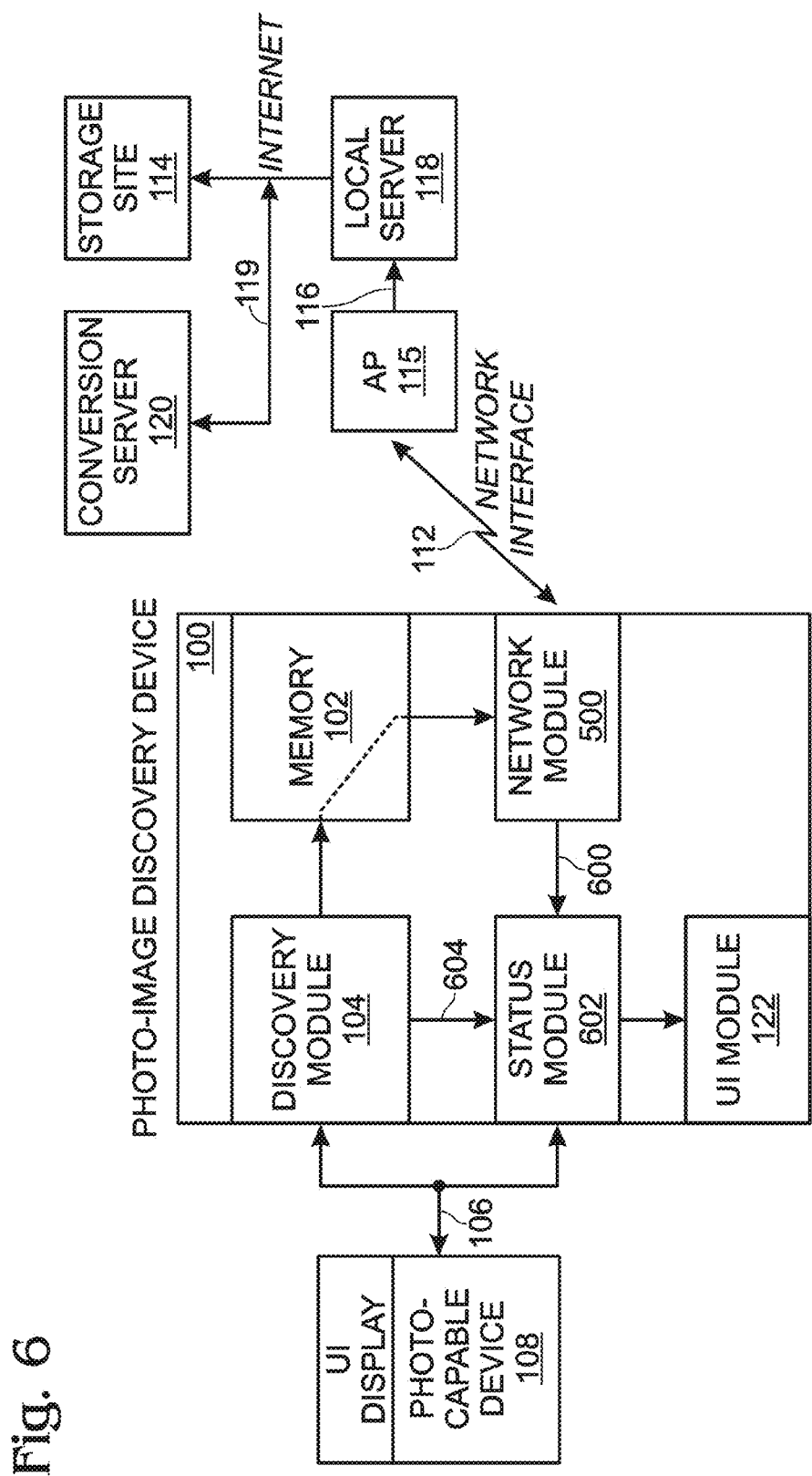
FIG. 6 is a schematic block diagram depicting a system for automatic photo-image uplink confirmation in a photo-image discovery device.

FIG. 6 is a schematic block diagram depicting a system for automatic photo-image uplink confirmation in a photo-image discovery device. The device 100 comprises a memory 102 and a discovery module 104 having a scanning interface 106 for detecting photo-capable devices 108. The discovery module 104 determines if detected photo-capable devices 108 have stored electronically formatted photo-images, and acquires the photo-images into the memory 102. A network module 500 has a network interface 112 for uploading the photo-images in the memory to a network-connected storage site 114, and a status interface on line 600 for supplying upload status information. A status module 602 has an interface on line 600 to receive the upload status information, and an interface on line 106 that is connected to the photo-capable device sourcing the photo-images, to automatically supply a log chronicling photo-image upload status. Alternately, the log is supplied to UI module 122, which may display the log via an LED display or speaker, for example.

If the log is sent to the photo-capable device, the status module 602 may supply the log in a photo-image file format for display on a user interface display of the photo-capable device. In one aspect, the status module 602 generates the log in a first file format (e.g., a text-based format) and converts the first file format to the photo-image format (e.g., JPEG). In another aspect, the status module 602 determines the photo-image file format of the acquired photo-images and converts the first file format to the determined photo-images. Thus, if the photo discovery device acquired GIF type photo-images from a camera 108, it would supply the log in the GIF format. The status module 602 may supply the log in one of the following photo-image file formats, which are commonly associated with image storage: JPEG, GIF, EXIF, native format, BMP, CR2, RAW, and MPEG. However, the log is not limited to just these examples. Neither is the log limited to only a photo-image file format. Other formats may include ASCII, TXT, PDF, and configuration files from game consoles.

The status module 602 generates a log chronicling upload status information such as upload complete (all the acquired photo-images were uploaded), no uplink connection, or uplink connection lost a first plurality of times (e.g., the photo discovery device attempted to find a WiFi uplink 5 times). The log can also record events such as photo-images rejected, file formats rejected (the photo-images are in the wrong format or the user does not have an account at the storage site), photo-image file format converted, image transformation operations, the file format types uploaded, the number of photo-images uploaded, authentification requirements (if any), and storage site unavailable. In one aspect, the status module 602 generates a log including a history of upload operations. Generally, the status module is able to log any type of activity that occurs (or, doesn't occur) in the uplinking process, and the above list of examples is not intended to be exhaustive.

In another aspect, the discovery module 104 has an interface on line 604 to supply photo-image acquisition information. The status module 602 receives the photo-image acquisition information, and supplies an acquisition report to the photo-image capable device sourcing the photo-images on line 106, chronicling the photo-image acquisition status. The status module 602 supplies the acquisition report in a photo-image file format for display on the user interface display of the photo-capable device 108. For example, most cameras have an LCD display that can be used for this purpose. Again, the status module 602 may generate the acquisition report in a first file format, determine the photo-image file format of the acquired photo-images, and convert the first file format to the determined photo-images. Alternately, the acquisition report may be presented via the UI module 122 of the discovery device 100.

In one aspect, the storage site cooperates in the supply of uplink information. That is, the network module 500 may receive uplink confirmation information from the storage site and supply the uplink confirmation information in the upload status information. For example, the storage site may download information about the number of photo-images received or account management information. Then, the status module 602 generates a log including the uplink confirmation information.

Figure 7:
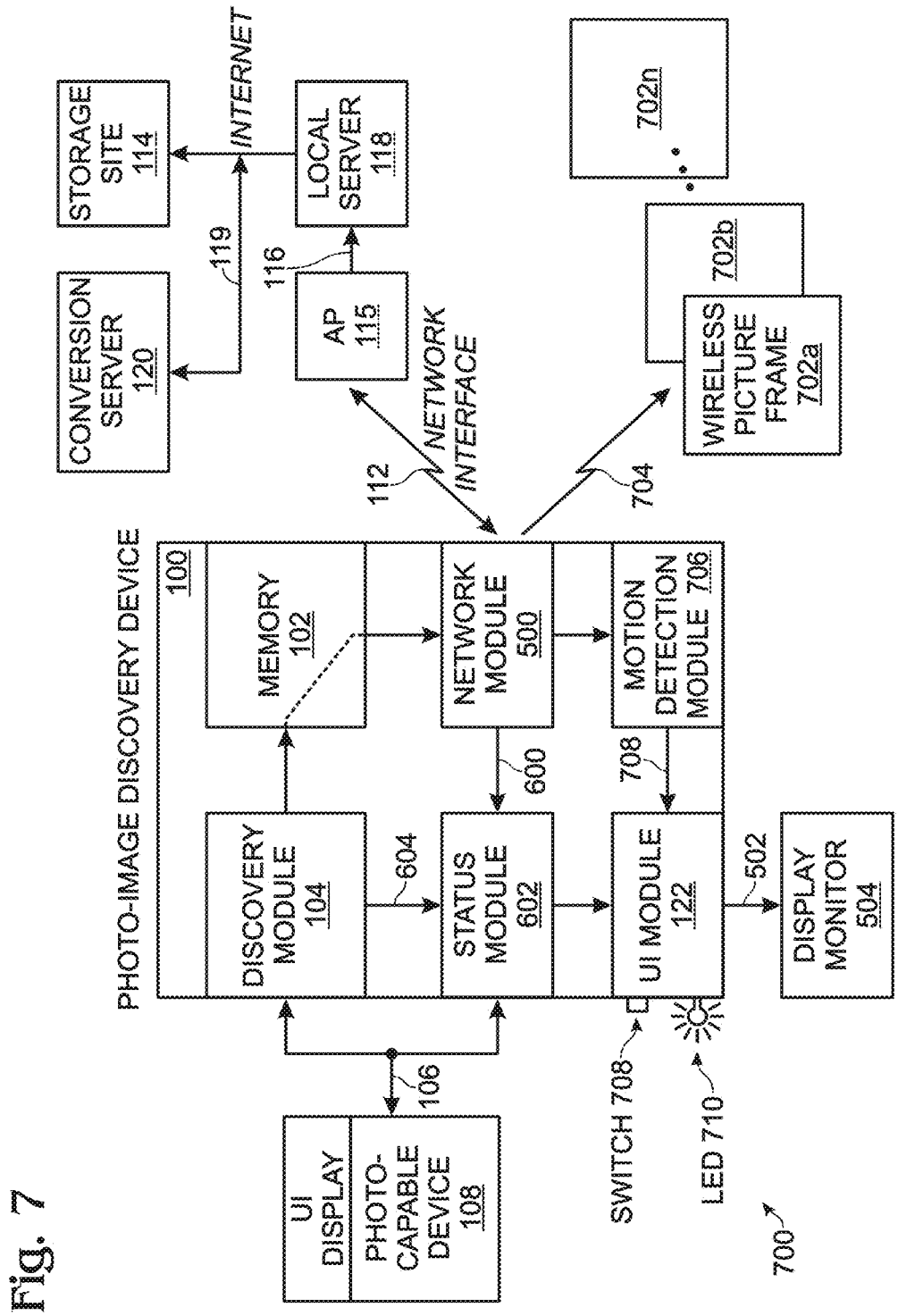
FIG. 7 is a schematic block diagram of a photo-image discovery device with a system for the local distribution of stored photo-images to wireless picture frames.

FIG. 7 is a schematic block diagram of a photo-image discovery device with a system for the local distribution of stored photo-images to wireless picture frames. Some details of the system 700 have been presented above in the description of FIGS. 1-6, and are not repeated here in the interest of brevity. The system 700 comprises a network module 500 for accessing photo-images from a network-connected storage site 114 and downloading selected photo-images. A UI module 122 has an interface on line 502 connected to a non-dedicated display monitor 504 for presenting a menu of photo-image user prompt options. Generally, the interface can be HDMI, USB, infrared, Bluetooth, or WiFi, but the system is not limited to any particular type of hardwired or wireless connection.

The prompt options are used to select stored photo-images in response to the network module 500 accessing the storage site 114. The prompt options also select wireless picture frame destinations 702. Shown are wireless picture frames 702a through 702n, where n is a variable not limited to any particular value. A wireless picture frame 702 is understood to be an electronic display dedicated to the display of a photo-image, or series of photo-images. The network module 500 wirelessly sends a selected photo-image to a selected wireless picture frame destination 700, as represented by reference designator 704. For example, the wireless interface represented by reference designator 704 may be Bluetooth or WiFi, but the system is not limited to any particular protocol.

In one aspect, the system 700 further comprises a motion detection module 706 for sensing photo-image discovery device motion, with an interface on line 708 connected to the UI module 122. In this aspect, the UI module 122 has an interface 504 to a wireless interface port of the display monitor 504 for presenting a menu of wireless picture frame destinations on the display monitor. Optionally, the motion detection feature can be enabled with a hardwire connection 502 to the display monitor 504. If the display monitor is not equipped for wireless communications, a wireless transceiver may be connected to a monitor input, and selected as the image source.

The wireless interface 504 is also used for selecting a wireless picture frame destination 700 in response to a detected motion. Note: in some aspects of the system, the UI module 122 communicates with the display monitor using the same frequencies and protocols as the network interface 112 or the wireless picture frame interface 704. In this aspect, the UI module 122 and network module 500 may share transceiver hardware components.

Figure 8:
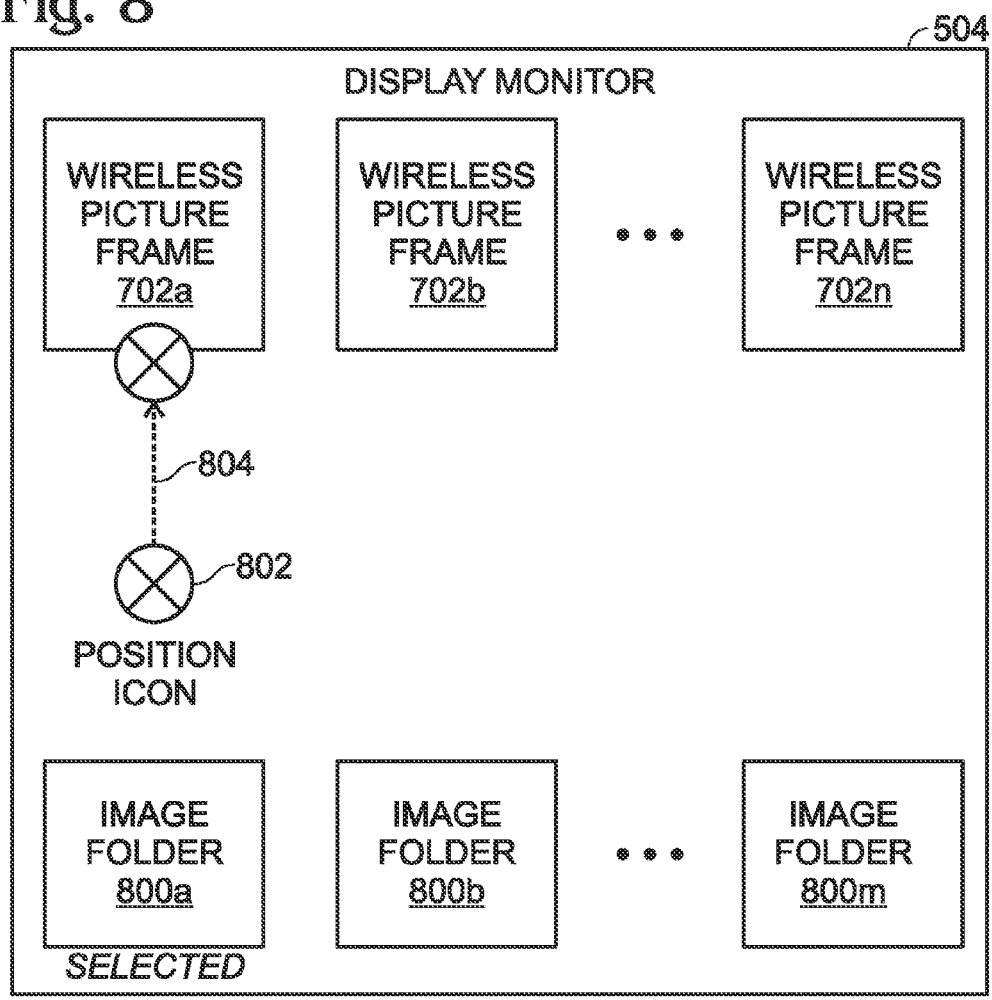
FIG. 8 is a diagram depicting an exemplary display menu for the selection of wireless picture frames.

FIG. 8 is a diagram depicting an exemplary display menu for the selection of wireless picture frames 702. The UI module generates a position icon 802 on the display monitor 504 responsive to the movement of the photo-image discovery device, and uses photo-image discovery device movements to steer the position icon from the selected photo-image to the selected destination. As shown, image folders 800a through 800m have been downloaded, and folder 800a has been selected, see pending patent application entitled, SYSTEM AND METHOD FOR VIRTUAL KIOSK STORED PHOTO-IMAGE REPRODUCTION, invented by Vaysburg et al., Ser. No. 12/431,914, filed Apr. 29, 2009.

The movement of the position icon 802 is represented by dotted line 804. In this example, the position icon is placed over an icon representing wireless picture frame 702a. The selection process may be completed, for example, by pressing a button associated with the UI module, or by another type of detectable motion. In one variation, the cooperation between the photo-image discovery device and the monitor requires an infrared "eye" adjacent (e.g., on top of) the display, for the purpose of tracking the movement of the handheld controller. Alternately, the system described herein does not require a separate device to reference motion.

FIG. 9 is a diagram depicting a variation in the selection of wireless picture frames. The motion detection module establishes a directional reference axis 900 for pointing and detects the photo-image discovery device 100 being pointed at an actual location of a wireless picture frame (e.g., as shown, 702a) in a local physical environment surrounding the photo-image discovery device. The UI module selects the wireless picture frame destination in response to the detected pointing motion. The reference axis 900 need not necessarily be associated with an optical device. In some aspects, as explained in more detail below, the axis may be more relative than shown, and established as a result of a movement or change of device 100 position.

Returning to FIG. 7, in one aspect the system 700 further comprises a user interface switch 708 connected to the user interface module 122. In a manner similar to the selection of the wireless picture frame depicted in FIG. 8, the UI module 122 may select a photo-image by generating a position icon on the display monitor 504 responsive to the direction in which the photo-image discovery device is pointed, and using photo-image discovery device movements to steer the position icon to a photo-image (or folder of images) on the display monitor. The UI module 122 receives a selection prompt in response to the switch 708 being engaged. The motion detection module 706 detects the motion of pointing at the wireless picture frame in the physical environment, and the UI module 122 selects the wireless frame in response to the switch 708 being released.

In another aspect, the system 700 further comprises a user interface signaling device 710, such as a light emitting diode (LED) or a speaker. An LED is shown. The UI module 122 has an interface connected to the UI signaling device 710 for presenting feedback confirming the wireless picture frame selection. In other words, a signaling pattern created by the LED (or set of LEDs) can be used to indicate the successful completion of a selection act.

Figure 10B:
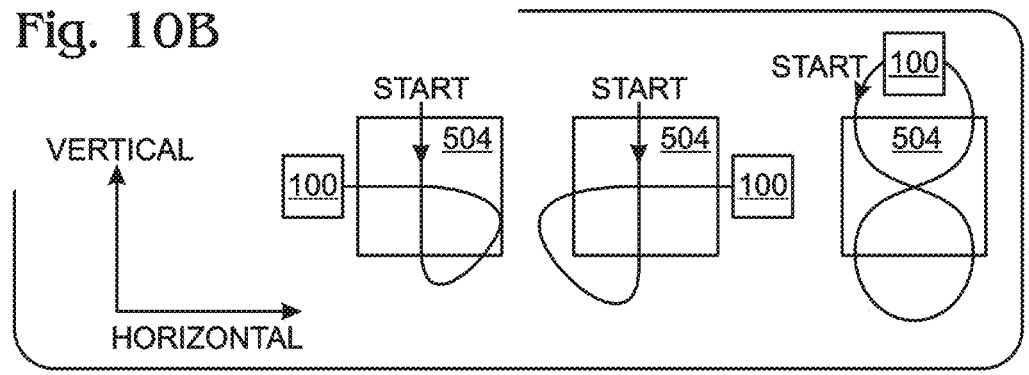

FIGS. 10A through 10E are diagrams depicting some exemplary motion prompts. The motion detection module detects one or more of the following motion prompts: point and select, on, off, select display, cancel selection, play, next, slow, previous, stop, next, start, and continuous. In FIG. 10A, the motion detection module interprets the "point and select" prompt in response to detecting a back-and-forth movement, towards and then away, followed by a rapid acceleration jerk in a vertical downward direction. The movement is depicted as a motion trail made be photo-image discovery device 100, where a cross-hatched line represents a rapid acceleration motion.

Figure 10C:
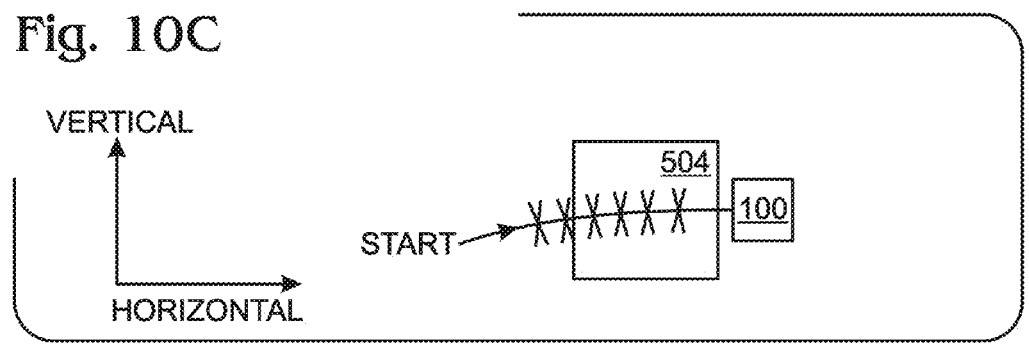
Figure 10D:
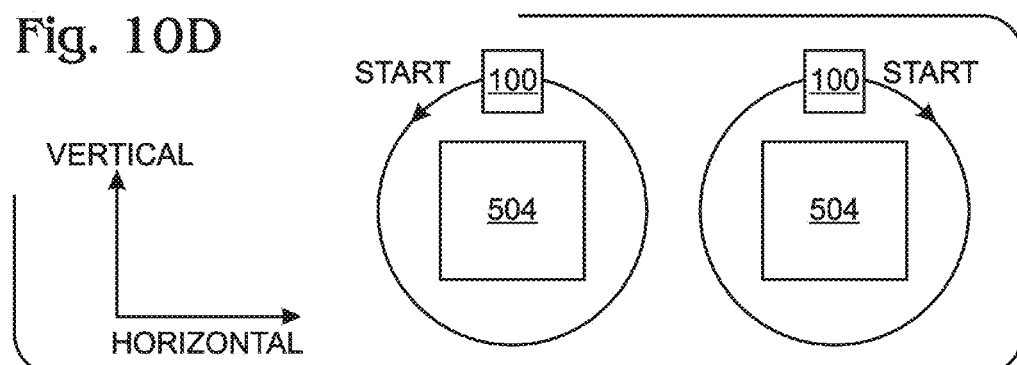
Figure 10E:
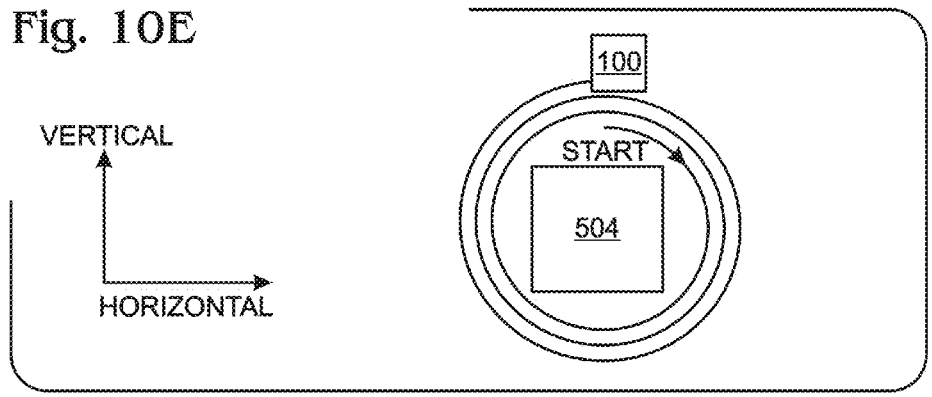

In FIG. 10B the motion detection module interprets the "stop" prompt in response to detecting a downward vertical movement crossed by a horizontal movement or figure-8 movement. In FIG. 10C the motion detection module interprets the "next" prompt in response to detecting a rapid acceleration jerk in a horizontal direction. The "next" prompt might be used for example, when flipping through photo-images or wireless picture frame options. In FIG. 10D the motion detection module interprets the "stop" prompt in response to detecting a circular movement. In FIG. 10E the motion detection module interprets the "continuous" prompt in response to detecting a plurality of circular movements. A "continuous" prompt might be used for example, to flip through options (without additional prompts), until a slow, fast, select, or stop command is received.

Although not specifically depicted, an "on" prompt might be signaled by shaking the photo-image discovery device several times. A "select" or "project" prompt may be signaled using a fishing pole casting motion. A "cancel" prompt may be signaled with an "X" motion. An "acknowledgement" (select is OK) prompt may be signaled with an "O" motion in the vertical plane. A "start" or "play" prompt may be signaled with an "O" motion in the horizontal plane. A "next" prompt may be signaled with a backwards wrist flick, such as in tugging a line. A "slow" prompt may be signaled with several wrist flicks. A progression from "stop" to "slow" to "forward" to "previous" may be signaled with wrist flicks to the right or left (from the perspective of a user facing the display monitor). The explicit command is dependent upon the previous command.

Motion detection prompts can also be used to select between different display monitors. A first display monitor can initially be designated as the "main" monitor, and a motion can be used to switch to a new monitor target.

Generally, the motion detection module detects a photo-image discovery device motion such as a change in position of the photo-image discovery device a change in a direction in which the photo-image discovery device is pointing, or an acceleration of the photo-image discovery device. Motions may be detected through the use of an accelerometer, or a plurality of accelerometers, where each accelerometer is aligned in a different plane, and/or the use of tracking software. For example, three orthogonally aligned accelerometers might be used. In addition, motion can also be tracked through the use of a GPS receiver, and/or position triangulation. For example, position can be calculated using three WiFi transmitters. The system is not limited to any particular means of device motion tracking.

In one aspect, the link between the network module 500 and the wireless picture frames is bi-directional. The UI module 122 selects a photo-image by generating a position icon on the display monitor responsive to the direction in which the photo-image discovery device is pointed, using photo-image discovery device movements to steer the position icon to a photo-image on the display monitor. The UI module receives a selection prompt in response to the switch 708 being engaged. Then, the network module 500 sends a selection signal to a plurality of wireless picture frames 700a-700n in the physical environment in response to the switch 708 being released. The network module 500 receives acknowledgement signals from each wireless picture frame 702a-702n reporting the signal strength of the received selection signal. The UI module 122 selects the wireless picture frame with the greatest reported signal strength.

In another aspect, subsequent to selecting a first wireless picture frame (e.g., 702a), the UI module 122 creates an icon on the display monitor 504 representing the first wireless picture frame (as in FIG. 8) and uses photo-image discovery device movements to steer the position icon from selected photo-images to the first wireless picture frame icon for subsequent selections.

The various components and modules of the photo discovery device may be enabled using state machine and combinational logic circuitry. Alternately, the device modules may be enabled using a software application of instructions that are stored in memory and executed by a processor. A photo discovery device processor with a configuration software application stored in memory is shown in FIG. 4A. Other applications in memory may include portions of the discovery, status, UI, motion detection, and network modules.

Functional Description

Conventionally, a user must perform many steps to store their pictures into a website for sharing, printing, or archiving. Further, a large proportion of these users either do not own a PC, or they are uncomfortable using a PC. These users would like to store, edit, print, and archive their pictures and video clips without having to go thru an intermediate step requiring the use of a PC.

To that end, the photo-image discovery device described in FIG. 1 automates the upload of files from devices such as a digital camera, 3G phones, and cell phone to a backend service by reducing/eliminating the user intervention. Reduced user intervention accelerates the availability of photo-images for sharing, viewing, protecting, and printing. Unlike conventional automatic acquisition technology, the photo-image discovery device disclosed herein is not limited to a single kind of image media, single image source, or single image destination.

The system described in FIG. 5 permits any monitor, including a TV screen, PC monitor, or digital picture frame to become a virtual kiosk for organizing pictures in a repository website or back end photo service center. The kiosk can be used to order prints and arrange delivery of those prints. The kiosk provides a home shopping experience without the bother of using a PC.

Figure 11:
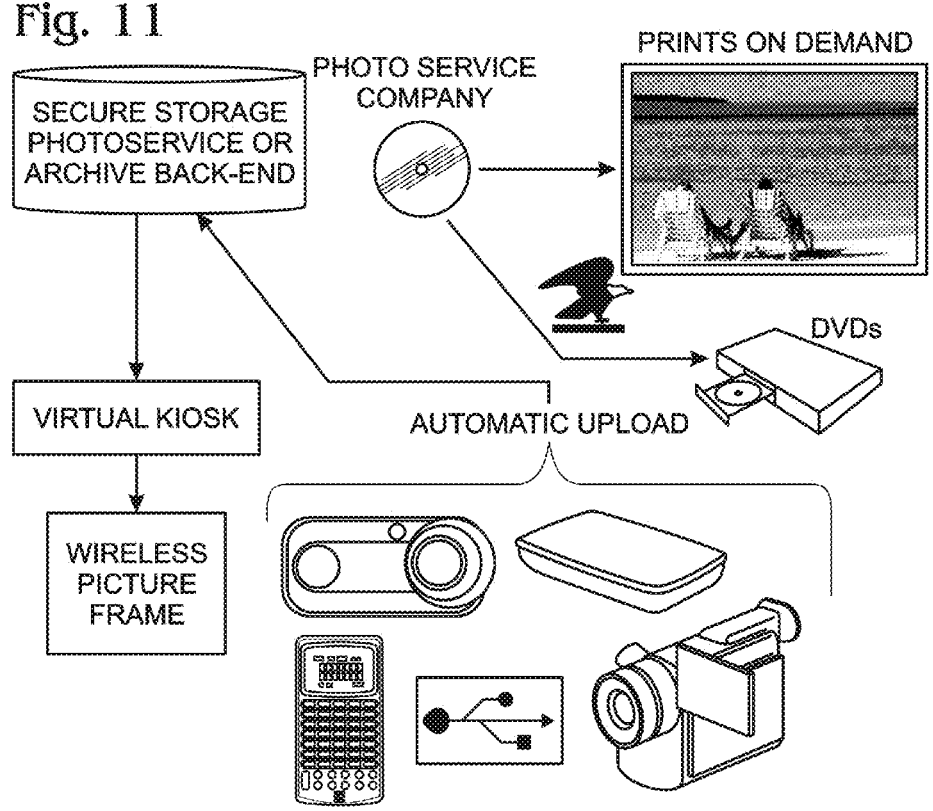
FIG. 11 is a diagram depicting the photo-image discovery device from a functional perspective.

FIG. 11 is a diagram depicting the photo-image discovery device from a functional perspective. In one aspect, a digital camera or SD memory card is connected to the photo-image discovery device using a USB cable. The photo-image discovery device automatically transfers pictures, video clips, files to its memory/storage and asynchronously starts to upload those files, thru WiFi, to an archive backend service or picture website.

From a cell phone, a Bluetooth connection may be established (pairing), and images acquired from the cell phone through the Bluetooth connection are uploaded to the backend service or the picture website. From a 3G phone, a WiFi connection is established with the photo-image discovery device and WiFi link is used to acquire pictures and video clips. A second WiFi link is used to transfer images from the photo-image discovery device to the backend service or picture website.

FIG. 12 is a flowchart illustrating a method for the local distribution of stored photo-images to wireless picture frames. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1200.

Step 1202 interfaces a photo-image discovery device, having no dedicated display, to a display monitor. Step 1204 presents a menu of photo-image user prompt options on the display monitor, originating from the photo discovery device. The photo-image discovery device can be connected to the display monitor via an interface such as HDMI, USB, infrared, Bluetooth, or WiFi. Step 1206 selects a photo-image from the storage site. Step 1208 selects a wireless picture frame destination. Step 1210 wirelessly sends the photo-image to the selected destination. For example, the photo-image discovery device interface to the wireless picture frame may be a Bluetooth or WiFi interface.

In one aspect, Step 1212 presents feedback confirming the wireless picture frame selection. For example, the feedback selected can be an image on the display monitor, an audio signal generated by the photo-image discovery device, or an LED signal generated by the photo-image discovery device.

In one aspect, interfacing the photo-image discovery device to the display monitor in Step 1202 includes interfacing to a display monitor having a wireless interface port. Then, selecting a wireless picture frame destination in Step 1208 includes substeps. Step 1208a presents a menu of wireless picture frame destinations. Step 1208b wirelessly selects the destination in response to a user prompt. For example, the destination may be selected in response to movement of the photo-image discovery device.

In one aspect, selecting the destination in response to movement of the photo-image discovery device (Step 1208b) includes substeps. Step 1208b1 generates a position icon on the display monitor responsive to the movement of the photo-image discovery device. Step 1208b2 uses photo-image discovery device movements to steer the position icon from the selected photo-image to the selected destination.

Alternately, Step 1202 interfaces a photo-image discovery device having a directional reference axis for pointing. Then, selecting the destination in response to movement of the photo-image discovery device in Step 1208b includes pointing the photo-image discovery device at the actual location of a wireless picture frame in a local physical environment surrounding the photo-image discovery device.

In another aspect, selecting the photo-image in Step 1206 includes substeps. Step 1206*a* generates a position icon on the display monitor responsive to the direction in which the photo-image discovery device is pointed. Step 1206*b* uses photo-image discovery device movements to steer the position icon to a photo-image on the display monitor. Step 1206*c* engages a switch on the photo-image discovery device to select the photo-image. Then, pointing the photo-image discovery device at the actual location of the wireless picture frame in the physical environment (Step 1208*b*) includes alternate substeps. Step 1208*b*3, while continuing to engage the switch, points the photo-image discovery device towards an actual wireless picture frame in the local physical environment. Step 1208*b*4 releases the switch to select the wireless picture frame. As another variation, Step 1208*b*5 releases the switch to transmit a selection signal to the wireless picture frame. In Step 1208*b*6 acknowledgement signals are received from a plurality of wireless picture frames, reporting the signal strength of the transmitted selection signal. Then, in Step 1208*b*7 the photo-image discovery device selects the wireless picture frame with the greatest reported signal strength.

In another variation, Step 1208*b*8, subsequent to selecting a first wireless picture frame, creating an icon on the display monitor representing the first wireless picture frame. Then, Step 1208*b*9 uses photo-image discovery device movements to steer the position icon from selected photo-images to the first wireless picture frame icon for subsequent selections.

The selection of the photo-image in Step 1206 and the selection of the wireless picture frame in Step 1208 may include moving the photo-image discovery device to create a prompts such as point and select, on, off, select display, cancel selection, play, next, slow, previous, stop, next, start, and continuous. This is not an exhaustive list of possible commands. Generally, selections made in response to photo-image discovery device movement such as changing the position of the photo-image discovery device, changing the direction in which the photo-image discovery device is pointing, and accelerating the photo-image discovery device.

A system and method have been provided for the local distribution of stored photo-images to wireless picture frames. Examples of specific processes and hardware modules have been given to illustrate the invention. However, the invention is not limited to merely these examples. Other variations and embodiments of the invention will occur to those skilled in the art.

We claim:

1. A method for the local distribution of stored photo-images to wireless picture frames, the method comprising:
   interfacing a photo-image discovery device having a motion detection module but no dedicated display, to a display monitor having a wireless interface port;
   presenting a menu of photo-image user prompt options on the display monitor, originating from the photo discovery device;
   in direct response to the movement of the photo-image discovery device selecting a photo-image from a network-connected storage site;
   selecting a wireless picture frame destination as follows:
   presenting a menu of wireless picture frame destinations; and,
   wirelessly selecting the destination in response to movement of the photo-image discovery device; and,
   wirelessly sending the photo-image to the selected destination°
   wherein selecting in response to movement of the photo-image discovery device includes:
   generating a position icon on the display monitor responsive to the movement of the photo-image discovery device; and,
   using photo-image discovery device movements to steer the position icon from the selected photo-image to the selected destination wherein
   interfacing the photo-image discovery device to the display monitor includes interfacing a photo-image discovery device having a directional reference axis for pointing; and,
   wherein selecting' the destination in response to movement of the photo-image discovery device includes pointing' the photo-image discovery device at an actual location of a wireless picture frame out of plurality of wireless picture frames in a local physical environment surrounding the photo-image discovery device.

2. The method of claim 1 wherein selecting the photo-image includes:
   generating a position icon on the display monitor responsive to the direction in which the photo-image discovery device is pointed;
   using'photo-image discovery device movements to steer the position icon to a photo-image on the display monitor;
   engaging a switch on the photo-image discovery device to select the photo-image;
   wherein pointing the photo-image discovery device at: the actual location of the wireless picture frame in the physical environment includes:
   while continuing to engage the switch, pointing the photo-image discovery device towards an actual wireless picture frame in the local physical environment; and,
   releasing the switch to select the wireless picture frame.

3. The method of claim 1 further comprising:
   presenting feedback confirming the wireless picture frame selection, the feedback selected from a group consisting of an image oil the display monitor, an audio signal generated by—the photo-image discovery device, and a light emitting diode (LED) signal generated by the photo-image discovery device.

4. The method of claim 1 wherein selecting the photo-image and selecting'the wireless picture frame includes moving'the photo-image discovery'device to create a prompt selected from a group consisting of point and select, on, off, select display, cancel selection, play, next, slow, previous, stop, next, start, and continuous.

5. The method of claim 1 wherein selecting the destination in response to movement of the photo-image discovery device includes movements selected from a group consisting of changing the position of the photo-image discovery device, changing the direction in which the photo-image discovery'device is pointing, and accelerating the photo-image discovery device.

6. The method of claim 1 wherein presenting the menu of photo-image user prompt options on the display monitor includes interfacing the photo-image discovery device to the display monitor via an interface selected from a group consisting of HDMI, USB, infrared, Bluetooth, and WiFi.

7. The method of claim 1 wherein wireless sending the photo-image to the selected destination includes interfacing the photo-image discovery device to the wireless picture frame via an interface selected from a group consisting of Bluetooth and WiFi.

8. The method of claim 1 wherein selecting the photo-image includes: generating a position icon on the display monitor responsive to the direction in which the photo-image discovery device is pointed; and,
using photo-image discovery device movements to steer the position icon a photo-image on the display monitor;
engaging a switch on the photo-image discovery device to select the photo-image;
wherein pointing the photo-image discovery device at: the actual location of the wireless picture frame in the physical environment includes:
while continuing to engage the switch, moving the photo-image discovery device towards an actual wireless picture frame in the local physical environment;
releasing the switch to transmit a selection signal to the wireless picture frame;
receiving acknowledgement signals from a plurality of wireless picture frames, reporting a signal strength of the transmitted selection signal; and,
the photo-image discovery device selecting the wireless picture frame with the greatest reported signal strength.

9. The method of claim 1 further comprising: subsequent to selecting a first wireless picture frame, creating an icon on the display monitor representing the first: wireless picture frame; and,
using photo-image discovery device movements to steer the position icon from selected photo-images to the first wireless picture frame icon fox subsequent selections.

10. A photo-image discovery device with a system for the local distribution of stored photo-images to wireless picture frames, the system comprising:
a network module for accessing photo-images from a network-connected storage site and downloading selected photo-images;
a user interface (UI) module having a wireless interface to a non-dedicated display monitor fox° presenting a menu of photo-image user prompt options including'wireless picture frame destinations, the prompt options selecting'stored photo-images in response to the network module accessing the storage site, and selecting wireless picture frame destinations in response to generating a position icon on the display monitor and using the photo-image discovery device to steer the position icon from the selected photo-image to the selected destination;
a motion detection module for steering the position icon on the display monitor in response to directly sensing the movement of the photo-image discovery device, the motion detection module having an interface connected to the UI module; and,
wherein the network module wirelessly sends a selected photo-image to the selected wireless picture frame destination wherein the motion detection module establishes a directional reference axis for pointing and detects the photo-image discovery device being pointed at an actual location of a wireless picture frame out of plurality of wireless picture frames in a local physical environment surrounding the photo-image discovery device.

11. The system of claim 10 further comprising: a user interface switch connected to the user interface module; wherein the UI module selects a photo-image by generating a position icon on the display'monitor responsive to the direction in which the photo-image discovery'device is pointed, using photo-image discovery device movements to steer the position icon to a photo-image on the display monitor, and receiving a selection prompt in response to the switch being'engaged; and,
wherein the motion detection module detects the motion of pointing at the wireless picture frame in [:tie physical environment; and,
wherein the UI module selects the wireless frame in response to the switch being released.

12. The system of claim 10 further comprising:
a user interface signaling device selected from a group consisting of a light emitting diode (LED) arid a speaker; arid, wherein the UI module has an interface connected to the UI signaling device for presenting feedback confirming the wireless picture frame selection.

13. The system of claim 10 wherein the motion detection module detects motion prompts selected from a group consisting of point: and select, on, off, select display, cancel selection, play, next:, slow, previous, stop, next:, start, and continuous.

14. The system of claim 10 wherein the motion detection module detects a photo-image discovery'device motion selected from a group consisting of a change in position of the photo-image discovery device, a change in a direction in which the photo-image discovery device is pointing, and an acceleration of the photo-image discovery device.

15. The system of claim 10 wherein the UI, module is interfaced to the display'monitor via an interface selected from a group consisting of HDMI, USB, infrared, Bluetooth, and WiFi.

16. The system of claim 10 wherein the network, module is interfaced to the wireless picture frame via an interface selected from a group consisting of Bluetooth and WiFi.

17. The method of claim 10 further comprising: a user interface switch connected to the user interface module;
wherein the UI module selects a photo-image by generating a position icon on the display'monitor responsive to the direction in which the photo-image discovery device is pointed, using photo-image discovery device movements to steer the position icon to a photo-image on the display monitor, and receiving a selection prompt in response to the switch being engaged; and,
wherein the network module sends a selection signal to a plurality of wireless picture frames in the physical environment in response to the switch being'released, and receives acknowledgement signals from each wireless picture frame reporting a signal strength of the received selection signal; and,
wherein the UI module selects the wireless picture frame with the greatest reported signal strength.

18. The system of claim 10 wherein the UI module, subsequent to selecting'a first wireless picture frame, creates an icon oil the display monitor representing the first: wireless picture frame and uses photo-image discovery device movements to steer the position icon from selected photo-images to the first wireless picture frame icon for subsequent selections.

* * * * *